United States Patent
Kim et al.

(10) Patent No.: US 10,501,358 B2
(45) Date of Patent: Dec. 10, 2019

(54) APPARATUS AND METHODS FOR PROCESSING MOLTEN MATERIAL

(71) Applicant: Corning Incorporated, Corning, NY (US)

(72) Inventors: Jin-soo Kim, Asan-si (KR); Kwangjin Kim, Painted Post, NY (US); Bonhyoung Koo, Yongin-si (KR)

(73) Assignee: Corning Incorporated, Corning, NY (US)

( * ) Notice: Subject to any disclaimer, the term of this patent is extended or adjusted under 35 U.S.C. 154(b) by 54 days.

(21) Appl. No.: 15/570,917

(22) PCT Filed: May 5, 2016

(86) PCT No.: PCT/US2016/030952
§ 371 (c)(1),
(2) Date: Oct. 31, 2017

(87) PCT Pub. No.: WO2016/179374
PCT Pub. Date: Nov. 10, 2016

(65) Prior Publication Data
US 2018/0354837 A1  Dec. 13, 2018

Related U.S. Application Data

(60) Provisional application No. 62/157,574, filed on May 6, 2015.

(51) Int. Cl.
*C03B 7/06* (2006.01)
*C03B 5/23* (2006.01)
(Continued)

(52) U.S. Cl.
CPC .................. *C03B 7/06* (2013.01); *C03B 5/16* (2013.01); *C03B 5/23* (2013.01); *C03B 5/44* (2013.01); *C03B 17/064* (2013.01)

(58) Field of Classification Search
CPC .... C03B 7/06; C03B 5/16; C03B 5/23; C03B 5/44
See application file for complete search history.

(56) References Cited

U.S. PATENT DOCUMENTS

| | | | |
|---|---|---|---|
| 3,134,660 A * | 5/1964 | Long | C03B 15/04 65/157 |
| 3,676,099 A * | 7/1972 | Fultz | C03B 5/20 432/161 |

(Continued)

FOREIGN PATENT DOCUMENTS

| | | | |
|---|---|---|---|
| JP | 57100921 A | 6/1982 | |
| JP | 9165222 A | 6/1997 | |

(Continued)

OTHER PUBLICATIONS

English language machine translation of Susumu (JP S57-100921).*

(Continued)

*Primary Examiner* — Jason L Lazorcik
(74) *Attorney, Agent, or Firm* — Kevin M. Able (57) ABSTRACT

A glass manufacturing apparatus comprises at least one nozzle facing a conduit and extending transverse to a travel path defined by the conduit. The at least one nozzle is configured to cool molten material within the interior of the conduit with a stream of cooling fluid forced against an exterior of the conduit along a cooling axis extending transverse to the travel path defined by the conduit. In further examples, methods of processing molten material includes cooling the molten material within an interior of a conduit by forcing a stream of cooling fluid against an exterior of the conduit along a cooling axis extending transverse to a travel path defined by the conduit.

13 Claims, 5 Drawing Sheets

(51) Int. Cl.
  *C03B 5/44* (2006.01)
  *C03B 5/16* (2006.01)
  *C03B 17/06* (2006.01)

(56) References Cited

U.S. PATENT DOCUMENTS

| | | | |
|---|---|---|---|
| 3,891,422 A * | 6/1975 | Froberg | C03B 5/027 65/137 |
| 3,897,234 A * | 7/1975 | Froberg | C03B 5/027 373/32 |
| 3,997,710 A * | 12/1976 | Maddux | C03B 5/027 373/40 |
| 4,424,071 A * | 1/1984 | Steitz | C03B 5/03 65/135.7 |
| 4,543,061 A * | 9/1985 | Edwards | F27B 7/3205 432/115 |
| 4,836,775 A * | 6/1989 | Heithoff | C03B 5/44 432/103 |
| 5,961,686 A * | 10/1999 | Chenoweth | C03B 5/0275 65/134.1 |
| 6,044,667 A * | 4/2000 | Chenoweth | C03B 5/0275 373/30 |
| 6,227,007 B1 * | 5/2001 | Palmquist | C03B 5/1672 65/135.1 |
| 2005/0109062 A1 | 5/2005 | Stelle et al. | |
| 2006/0242996 A1 | 11/2006 | DeAngelis et al. | |
| 2007/0151297 A1 * | 7/2007 | DeAngelis | C03B 5/04 65/29.21 |
| 2008/0090087 A1 | 4/2008 | Shoji et al. | |
| 2010/0126223 A1 * | 5/2010 | Thomas | C03B 5/031 65/126 |
| 2010/0223957 A1 * | 9/2010 | Moon | C03B 18/16 65/182.3 |
| 2011/0289967 A1 | 12/2011 | Burdette | |
| 2013/0125591 A1 | 5/2013 | Yamamoto et al. | |
| 2013/0283861 A1 * | 10/2013 | Mobley | C03B 5/167 65/135.1 |
| 2013/0327092 A1 * | 12/2013 | Charbonneau | C03B 5/04 65/29.21 |
| 2015/0107306 A1 * | 4/2015 | Goller | C03B 5/04 65/135.1 |
| 2016/0297701 A1 * | 10/2016 | Hwang | C03B 5/23 |

FOREIGN PATENT DOCUMENTS

| | | |
|---|---|---|
| JP | 2002274857 A | 9/2002 |
| JP | 2003054955 A | 2/2003 |

OTHER PUBLICATIONS

International Search Report and Written Opinion PCT/US2016/030952 dated Oct. 27, 2016.
English Translation of JP2017557165 Office Action dated Mar. 6, 2019; 3 Pages; Japanese Patent Office.

* cited by examiner

APPARATUS AND METHODS FOR PROCESSING MOLTEN MATERIAL

This application claims the benefit of priority under 35 U.S.C. § 119 of U.S. Provisional Application Ser. No. 62/157,574, filed on May 6, 2015, the content of which is relied upon and incorporated herein by reference in its entirety.

FIELD

The present disclosure relates generally to apparatus and methods for processing molten material and, more particularly, to apparatus and methods for processing molten material flowing through an interior of a conduit.

BACKGROUND

It is known to manufacture glass ribbon from molten material. Typically, molten material is processed with a glass manufacturing apparatus including several stations arranged in series. In some examples, a pair of stations is joined with a conduit defining a travel path for molten material traveling from a first station to a second station.

SUMMARY

The following presents a simplified summary of the disclosure in order to provide a basic understanding of some example aspects described in the detailed description.

In accordance with embodiment disclosed herein, a method of processing molten material is described comprising flowing molten material through an interior of a conduit along a travel path defined by the conduit from a first station to a second station of a glass manufacturing apparatus. The method may further include cooling the molten material within the interior of the conduit by forcing a stream of cooling fluid against an exterior of the conduit along a cooling axis extending transverse to the travel path between a first lateral side and a second lateral side of the conduit.

In some embodiments, the cooling axis can extend perpendicular to the travel path.

In some embodiments, the cooling axis can comprise a linear cooling axis.

In still other embodiments, the cooling axis may extend within a channel defined by the conduit that extends transverse relative to the travel path. For example, the stream of cooling fluid may be forced against a base of the channel. In other examples, the stream of cooling fluid may be dispersed by the base of the channel to travel up opposite sides of the channel.

In some embodiments, the stream of cooling fluid can comprise a sheet of cooling fluid. For example, the sheet of cooling fluid may comprise a substantially continuous sheet of cooling fluid.

In further embodiments, the stream of cooling fluid may comprise an overall impact length along the cooling axis. The stream of cooling fluid can comprise a substantially continuous stream of cooling fluid along the overall impact length.

In still further embodiments, the cooling fluid may be substantially free of oxygen. For example, the cooling fluid may comprise nitrogen.

The foregoing embodiments and examples can be provided alone or in any combination with one or any combination discussed above.

In accordance with another embodiment, a glass manufacturing apparatus is disclosed comprising a first station, a second station, and a conduit defining a travel path for molten material traveling from the first station to the second station. The glass manufacturing apparatus may further include at least one nozzle facing the conduit and extending transverse relative to the travel path. The at least one nozzle may be configured to cool molten material within an interior of the conduit. For example, in some embodiments the molten material is cooled by forcing cooling fluid through the at least one nozzle to create a stream of cooling fluid. The stream of cooling fluid can be forced against an exterior of the conduit along a cooling axis extending transverse to the travel path between the first lateral side of the conduit and the second lateral side.

In some embodiments, the at least one nozzle can comprise at least one elongated port extending transverse to the travel path. The at least on elongated port may include an elongated length and a width extending transverse to the elongated length.

In other embodiments, the width of the elongated port may be within a range of from about 0.4 cm to about 2.4 cm.

In still other embodiments, the width of the elongated port can be less than about 5% of the elongated length of the elongated port.

In yet other embodiments, the at least one elongated port can comprise a single elongated port extending along the entire elongated length of the elongated port.

In various embodiments, the at least one nozzle can include an elongated pressure chamber including an elongated length extending along the elongated length of the at least one elongated port. The elongated pressure chamber may be in fluid communication with the elongated port.

In still further embodiments, the at least one nozzle can include a first lateral side portion and a second lateral side portion with the elongated length of the at least one elongated port at least partially extending between the first lateral side portion and the second lateral side portion. The at least one nozzle may further include at least two inlet ports including a first inlet port located at the first lateral side portion and a second inlet port located at the second lateral side portion.

In some embodiments, the first station can comprise a mixing station.

In embodiments, the second station can comprise a delivery vessel.

The foregoing embodiments and examples can be provided alone or in combination with one or any combination discussed above.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets produced by apparatus and methods of the present disclosure are commonly used, for example, in display applications, for example liquid crystal displays (LCDs), electrophoretic displays (EPD), organic light emitting diode displays (OLEDs), plasma display panels (PDPs), or the like. In some examples, glass sheets may be separated from a glass ribbon produced by a glass manufacturing apparatus.

Figure 1:
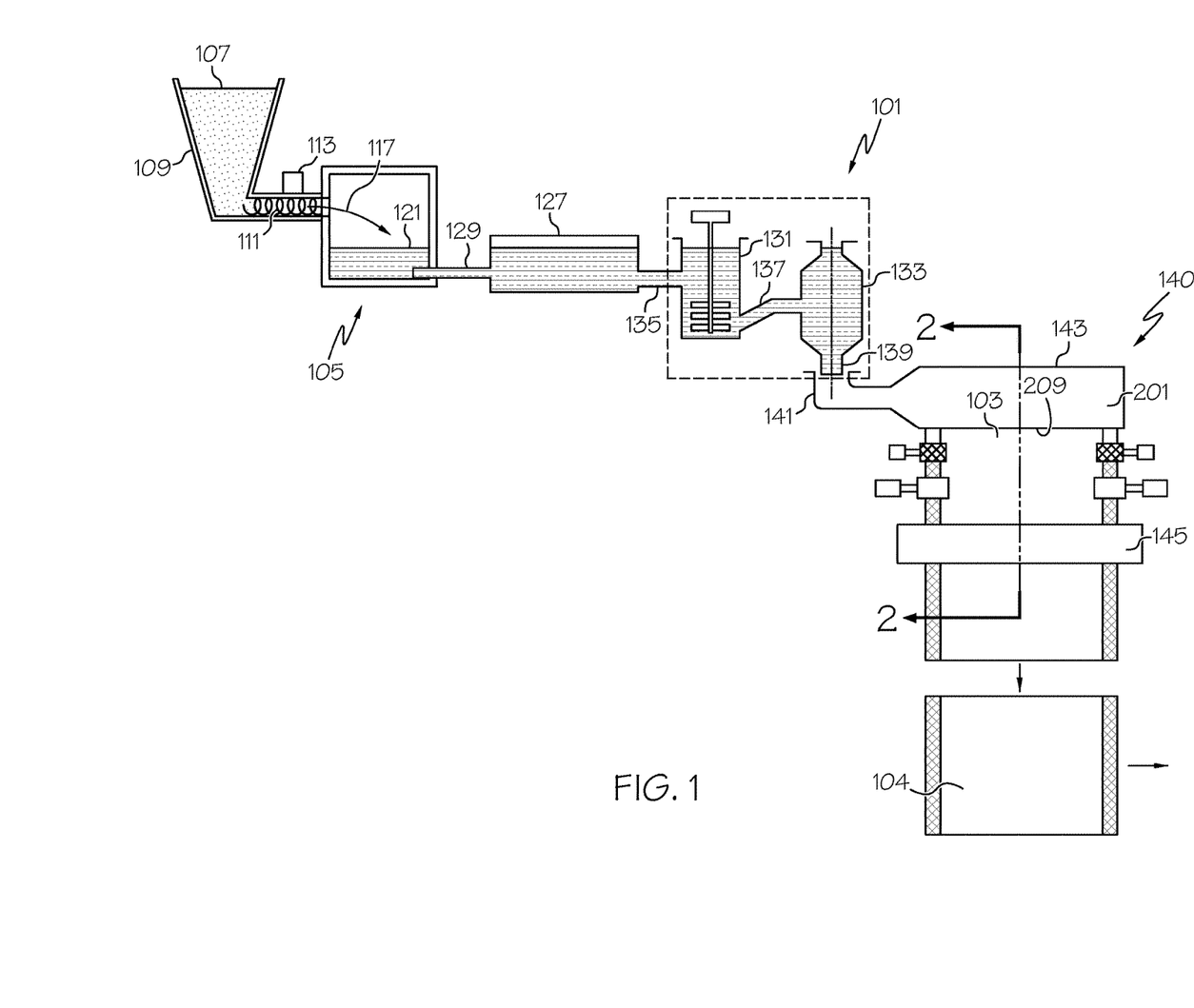
FIG. 1 schematically illustrates an example glass manufacturing apparatus.

In some embodiments, the glass manufacturing apparatus can comprise a slot draw apparatus, float bath apparatus, down-draw apparatus, up-draw apparatus, press-rolling apparatus or other glass manufacturing apparatus. By way of example, FIG. 1 schematically illustrates a glass manufacturing apparatus 101 for processing a quantity of molten material comprising a fusion down-draw apparatus for fusion drawing a glass ribbon 103 for subsequent processing into glass sheets 104. The fusion draw apparatus 101 can include a plurality of stations arranged in series (e.g., a melting vessel 105, a fining vessel 127, a mixing chamber 131, a delivery vessel 133 and a forming vessel 143) wherein molten material may sequentially travel through the stations to produce the glass ribbon 103 from the molten material 121.

The melting vessel 105 may be configured to receive batch material 107 from a storage bin 109. The batch material 107 can be introduced by a batch delivery device 111 powered by a motor 113 to introduce a desired amount of batch material 107 into the melting vessel 105, as indicated by arrow 117. The melting vessel 105 may then melt the batch material 107 into the molten material 121.

The fusion draw apparatus 101 can also include the fining vessel 127 that can be located downstream from the melting vessel 105 and coupled to the melting vessel 105 by way of a first conduit 129. In some examples, the molten material 121 may be gravity fed from the melting vessel 105 to the fining vessel 127 by way of the first conduit 129. For instance, gravity may drive the molten material 121 through an interior of the first conduit 129 from the melting vessel 105 to the fining vessel 127. Within the fining vessel 127, bubbles may be removed from the molten material 121 by various techniques.

The fusion draw apparatus can further include the mixing chamber 131 that may be located downstream from the fining vessel 127. The mixing chamber 131 can be used to provide a homogenous molten material composition, thereby reducing or eliminating inhomogeneity that may otherwise exist within the fined molten material exiting the fining vessel. As shown, the fining vessel 127 may be coupled to the mixing chamber 131 by way of a second conduit 135. In some examples, the molten material 121 may be gravity fed from the fining vessel 127 to the mixing chamber 131 by way of the second conduit 135. For instance, gravity may drive the molten material 121 through an interior of the second conduit 135 from the fining vessel 127 to the mixing chamber 131.

The fusion draw apparatus can further include the delivery vessel 133 that may be located downstream from the mixing chamber 131. The delivery vessel 133 may condition the molten material 121 to be fed into a forming device. For instance, the delivery vessel 133 can act as an accumulator and/or flow controller to adjust and provide a consistent flow of molten material 121 to the forming vessel 143. As shown, the mixing chamber 131 may be coupled to the delivery vessel 133 by way of a third conduit 137. In some examples, molten material 121 may be gravity fed from the mixing chamber 131 to the delivery vessel 133 by way of the third conduit 137. For instance, gravity may drive the molten material 121 through an interior of the third conduit 137 from the mixing chamber 131 to the delivery vessel 133.

As further illustrated, a downcomer 139 can be positioned to deliver the molten material 121 from the delivery vessel 133 to an inlet 141 of the forming vessel 143 of a fusion draw machine 140. As discussed more fully below, the fusion draw machine 140 may be configured to draw the molten material 121 into a glass ribbon 103.

The conduits (e.g., the first conduit 129, the second conduit 135, and the third conduit 137) of the glass manufacturing apparatus 101 can include an interior surface comprising a wide variety of shapes. For instance, a cross-sectional profile shape of the interior surface taken perpendicular to a travel path provided for the molten material can comprise a circular shape or a non-circular shape (e.g., an oblong shape, an elliptical shape or other shape configuration). In some examples, the same or geometrically similar cross-sectional profile shape may exist along a length of the conduit. Providing the conduit with a cross-sectional profile shape that is non-circular can increase the efficiency of transferring heat from the molten glass in the conduit.

The melting vessel 105 and the forming vessel 143 are typically made from a refractory material, for example refractory (e.g. ceramic) brick. The glass manufacturing apparatus 101 may further include components that are typically made from platinum or platinum-containing metals, for example platinum-rhodium, platinum-iridium and combinations thereof, but which may also comprise other refractory metals for example molybdenum, palladium, rhenium, tantalum, titanium, tungsten, ruthenium, osmium, zirconium, and alloys thereof and/or zirconium dioxide. The platinum-containing components can include one or more of the first conduit 129, the fining vessel 127, the second conduit 135, the mixing chamber 131, the third conduit 137, the delivery vessel 133, the downcomer 139 and the inlet 141.

Figure 2:
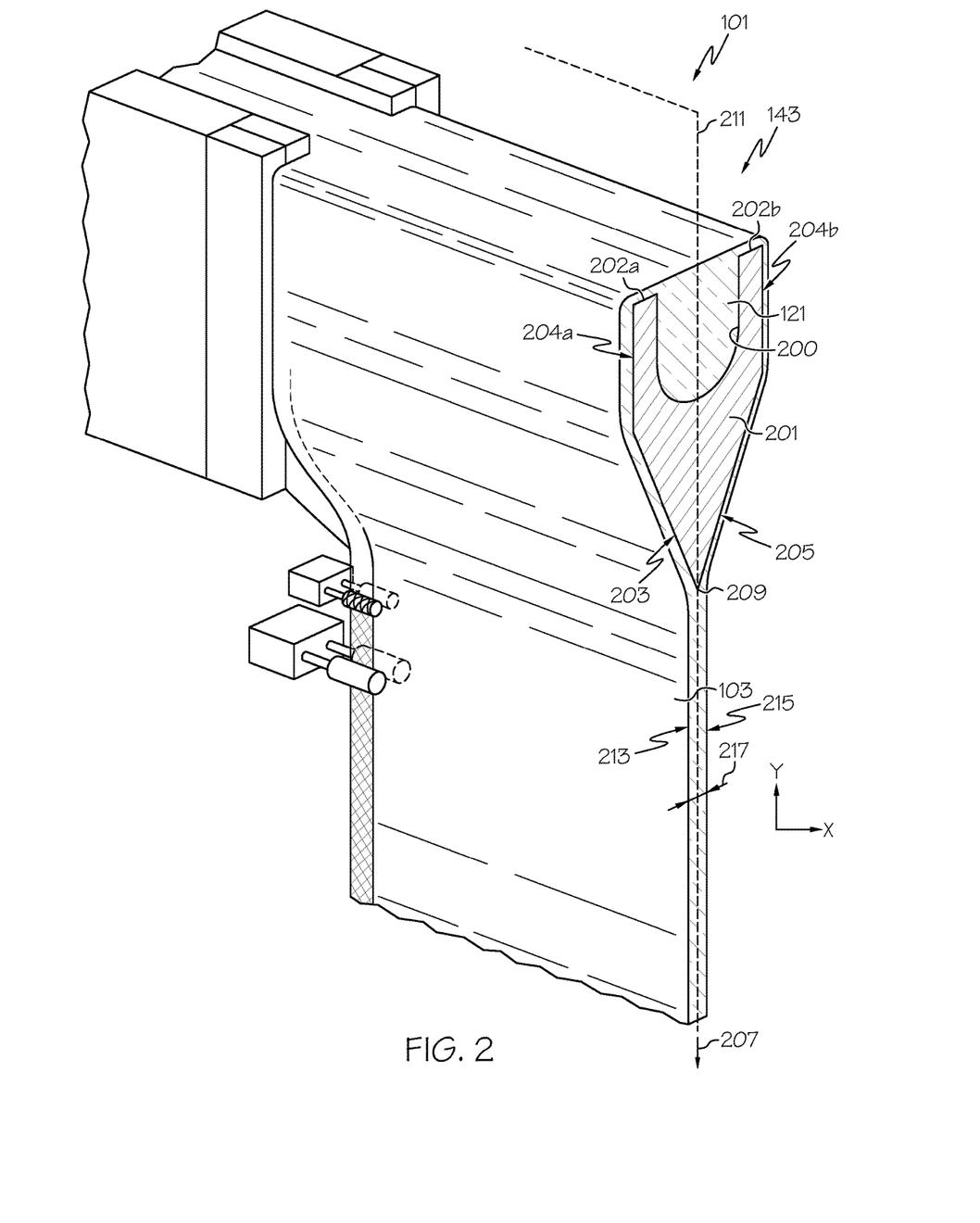
FIG. 2 illustrates a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. As shown, the forming vessel 143 includes a forming wedge 201 comprising a pair of downwardly inclined forming surface portions 203, 205 extending between opposed ends of the forming wedge 201. The pair of downwardly inclined forming surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

Referring to FIG. 2, in one example, the molten material 121 can flow into a trough 200 of the forming vessel 143. The molten material 121 can then simultaneously flow over corresponding weirs 202a, 202b and downward over the outer surfaces 204a, 204b of the corresponding weirs 202a, 202b. Respective streams of molten material then flow along the downwardly inclined forming surface portions 203, 205 to the root 209 of the forming vessel 143, where the flows converge and fuse into the glass ribbon 103. The glass ribbon 103 may then be drawn off the root 209 in the draw plane 211 along draw direction 207.

As shown in FIG. 2, the glass ribbon 103 can be drawn from the root 209 with a first major surface 213 and a second major surface 215. As shown, the first major surface 213 and the second major surface 215 face opposite directions with a thickness 217 of a central portion the glass ribbon 103 defined between the first major surface 213 and the second major surface 215. Although aspects of the disclosure may be beneficial to produce many alternative thicknesses (e.g., including thicknesses of greater than 1 millimeter or less than 50 micrometers), in some examples, the thickness 217 of the central portion can be less than or equal to about 1 millimeter (mm), for example, from about 50 micrometers ($\mu m$) to about 750 $\mu m$, for example from about 100 $\mu m$ to about 700 $\mu m$, for example from about 200 $\mu m$ to about 600 $\mu m$, for example from about 300 $\mu m$ to about 500 $\mu m$.

In one example, glass ribbon 103 drawn off the root 209 may be separated into individual glass sheets 104 with a glass separation apparatus 145. Alternatively, although not shown, the glass ribbon may be passed through further processing stations and/or may be stored as a roll of glass ribbon rather than being immediately separated into individual glass sheets 104.

In some examples, there may be a desire to cool molten material traveling within one or more of the conduits (e.g., the first conduit 129, second conduit 135, third conduit 137, etc.) between adjacent stations (e.g., the melting vessel 105, the fining vessel 127, the mixing chamber 131, the delivery vessel 133 and the forming vessel 143) of the glass manufacturing apparatus 101. Discussion of cooling will be described with respect to the third conduit 137 extending between a first station (e.g., the mixing chamber 131) and a second station (e.g., the delivery vessel 133) of the glass manufacturing apparatus 101. Although not shown, the concepts of the disclosure may be applied to any of the other illustrated conduits (e.g., the first conduit 129, the second conduit 135) or any other conduit in other example glass manufacturing apparatus. Moreover, the illustrated stations are only one example configuration wherein the stations are arranged in series with the fining vessel 127 positioned downstream from the melting vessel 105, the mixing chamber 131 positioned downstream from the fining vessel 127, the delivery vessel 133 positioned downstream from the mixing chamber 131, and the forming vessel 143 positioned downstream from the delivery vessel 133. In some examples, more or less stations may be provided and/or the stations may be arranged in a different order wherein concepts of the disclosure may be applied to cool molten glass within a conduit providing a travel path for molten material traveling between stations in the series of stations. In other examples, multiples of particular stations may be provided, for example multiple mixing chambers.

Figure 3:
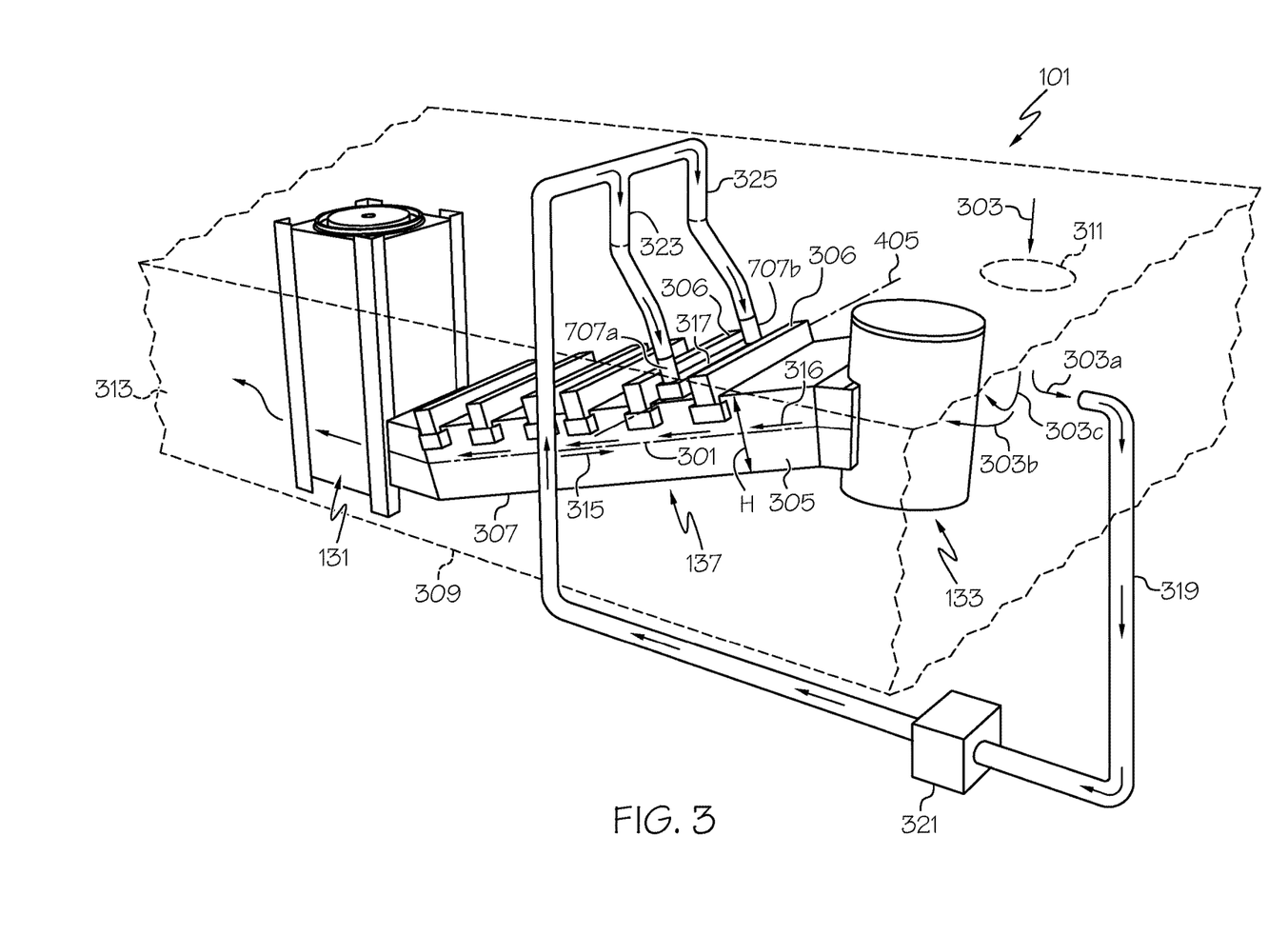
FIG. 3 is a schematic perspective view illustrating an example nozzle extending transverse to a travel path defined by a conduit.

Turning to FIG. 3, by way of example, the glass manufacturing apparatus 101 includes a first station that may comprise the illustrated mixing chamber 131. The glass manufacturing apparatus 101 may further include a second station that may comprise the illustrated delivery vessel 133. The glass manufacturing apparatus still further includes the third conduit 137 extending between and fluidly coupled to the first station and the second station. As illustrated schematically in FIG. 3, the third conduit 137 can be configured to provide a travel path 301 for the molten material 121 traveling in a direction 315 from the first station to the second station.

There may be a desire to lower the temperature of the molten material 121 from a relatively high temperature in the mixing chamber 131 to a relatively low temperature in the delivery vessel 133. Lowering the temperature of the molten material 121 can be desirable to provide a desired molten material property (e.g., viscosity) for processing the molten material 121 into the glass ribbon 103 with the fusion draw machine 140.

In one example, cooling fluid 303, such as gas, may be passed along an exterior 305 of the conduit 137 to achieve an increased cooling rate of the molten material within the conduit 137. Indeed, a relatively cool fluid may pass along the conduit 137 to provide convective heat transfer, thereby removing heat from the conduit 137 that consequently reduces the temperature of the molten material 121 within the interior of the conduit 137. The conduit 137 may include a core 307 fabricated from refractory metals (e.g., platinum or platinum-containing metals) that defines the interior of the conduit defining the travel path 301. The conduit 137 can include other features such as coverings, coatings, or support structures in addition to the core 307. For instance, as partially schematically illustrated, the conduit may include support structures 306 that may facilitate support of a core 307 of the conduit 137. The cooling fluid 303 may be passed along the exterior 305 of the conduit 137 such as the exterior of the core 307, the support structures 306 or other features of the conduit 137.

As shown in FIG. 3, the conduit 137 may optionally be placed within a containment area 309. As further shown in FIG. 3, the first station (e.g., the mixing chamber 131) and the second station (e.g., the delivery vessel 133) may also be placed in the containment area 309. Placing the conduit 137, the first station and the second station within the containment area 309 can help guide a controlled quantity of fluid to travel along a travel path from an upstream portion 311 of the containment area 309 to a downstream portion 313 of the containment area 309. Moreover, the containment area 309 can be designed to place the conduit 137, first station and second station within an atmosphere that may be substantially free from oxygen. Throughout the application, an atmosphere that is substantially free from oxygen means the atmosphere includes less than or equal to 2% by weight of oxygen. As such, oxidation of portions of the glass manufacturing apparatus 101 can be minimized, such as prevented, to avoid contaminating the molten material being processed by the glass manufacturing apparatus 101. In some examples, the cooling fluid may be substantially free from oxygen and may comprise an inert gas, such as nitrogen, although the cooling fluid may comprise other chemical elements in further examples.

In operation, molten material 121 may travel along the travel path 301 of the conduit 137 in the direction 315 from the first station (e.g., the mixing chamber 131) toward the second station (e.g., the delivery vessel 133). Optionally, the cooling fluid may travel along a path in a direction 316 from the second station toward the first station. Providing a cooling fluid that flows in the general opposite direction of the flow of molten material can provide enhanced convective heat transfer near the second station since the temperature difference between the cooling fluid and the conduit 137 will be higher near the second station than near the first station.

There may be a desire to quickly and efficiently reduce the temperature of the molten material 121 within the interior of the conduit 137 to provide the desired temperature in the second station (e.g., delivery vessel 133). Providing increased heat transfer can allow for increased flow of molten material within the conduit, thereby allowing for an increased rate of glass ribbon production. Moreover, providing increased heat transfer can reduce the length of the conduit that needs to be provided. Indeed, a relatively long conduit used to cool with a less efficient technique may be significantly shortened with more efficient heat transfer. Providing a relatively short conduit can be beneficial to reduce the quantity of expensive refractory metals used to produce the conduit.

Figure 4:
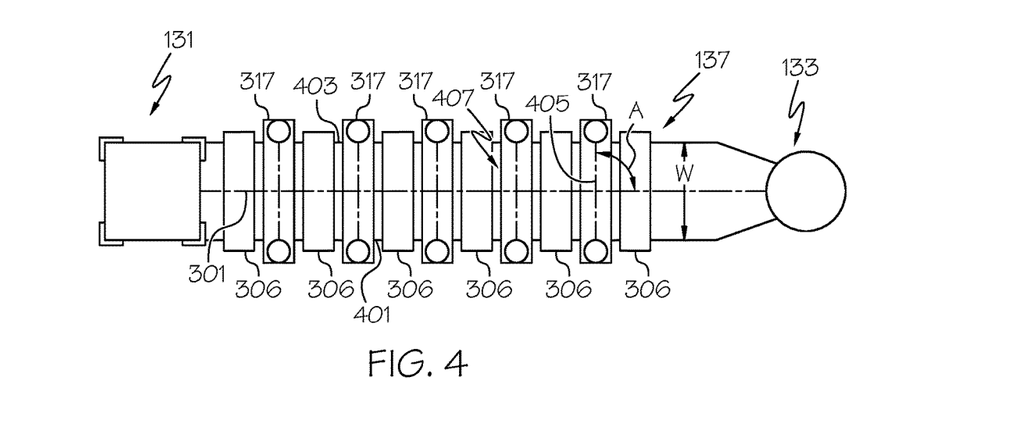
FIG. 4 is a schematic top view of a conduit including a plurality of nozzles extending transverse to a travel path defined by the conduit.
Figure 5:
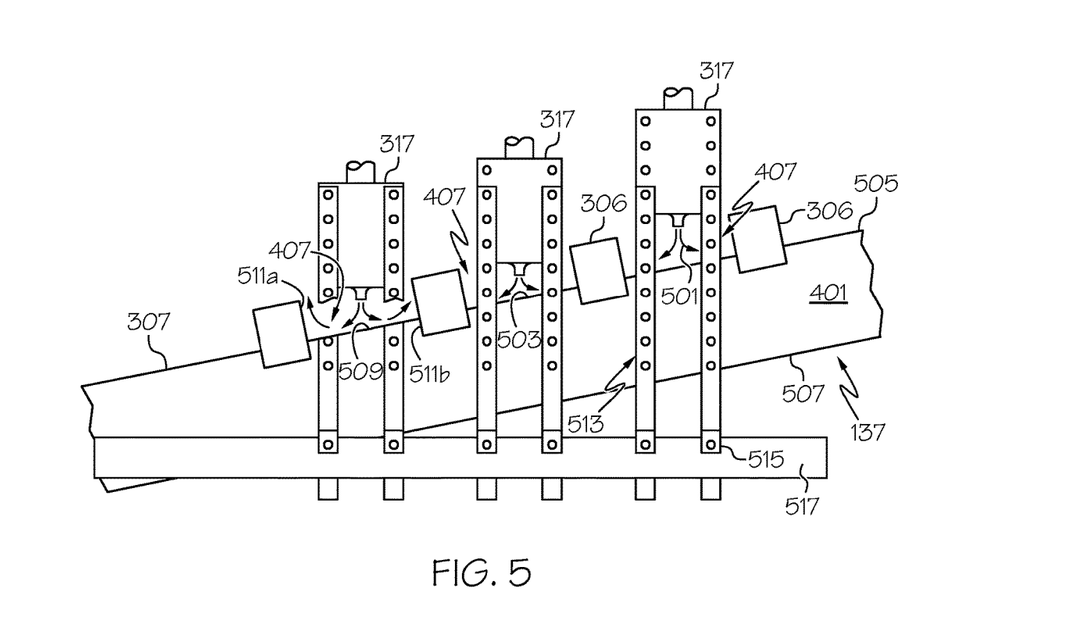
FIG. 5 illustrates schematic side view of a conduit including a plurality of nozzles extending transverse to a travel path defined by the conduit.

As can be appreciated by FIGS. 3 and 4, the conduit 137 may include a height "H" that may be less than the width "W". Such designs may be beneficial to provide an oblong or elliptical shape that can provide enhanced heat transfer of the molten material traveling within the conduit. As shown in FIG. 3, to increase heat transfer, the glass manufacturing apparatus 101 can include at least one nozzle 317. As shown in FIG. 5, the at least one nozzle 317 can comprise the illustrated plurality of nozzles 317. In the illustrated example, each of the nozzles 317 face the conduit 137 such that a stream of cooling fluid 501 forced from the nozzle 317 is forced against an exterior 503 of the conduit 137. As shown in FIG. 4, each nozzle 317 extends transverse to the travel path 301 defined by the conduit 137 between a first lateral side 401 of the conduit 137 and a second lateral side 403 of the conduit 137. The at least one nozzle 317, such as the illustrated single nozzle 317 in FIG. 1 or the illustrated plurality of nozzles 317 in FIGS. 4 and 5, are arranged such that the at least one nozzle is configured to cool molten material 121 within the interior of the conduit 137 by forcing cooling fluid through the at least one nozzle to create the stream of cooling fluid 501 that is forced against the exterior 503 of the conduit 137. Nozzles may be positioned along the top portion 505, bottom portion 507, first lateral side 401 and/or the second lateral side 403. However, since the top portion (and bottom portion) may have the width "W" that is greater than the height "H" of the lateral sides, the surface area of the top and bottom portions are relatively larger than the surface area of the lateral sides. Consequently, due to the larger surface area, a greater heat transfer rate may be provided by associating the at least one nozzle with the top and bottom portions rather than associating the at least one nozzle with the lateral sides.

As schematically illustrated in FIG. 4, the at least one nozzle 317 may also create a stream of cooling fluid 501 along a cooling axis 405 extending transverse to the travel path 301 defined by the conduit 137 between the first lateral side 401 of the conduit 137 and the second lateral side 403 of the conduit 137. As illustrated, the cooling axis 405 may extend at an angle "A" relative to travel path 301. The angle "A" may fall within a wide range of angles from greater than 0° to about 90°, such as from about 5° to about 90°, such as from about 15° to about 90°, such as from about 25° to about 90°, such as from about 35° to about 90°, such as from about 45° to about 90°, such as from about 55° to about 90°, such as from about 65° to about 90°, such as from about 75° to about 90°, such as from about 85° to about 90°, including all ranges and sub-ranges therebetween.

Figure 6:
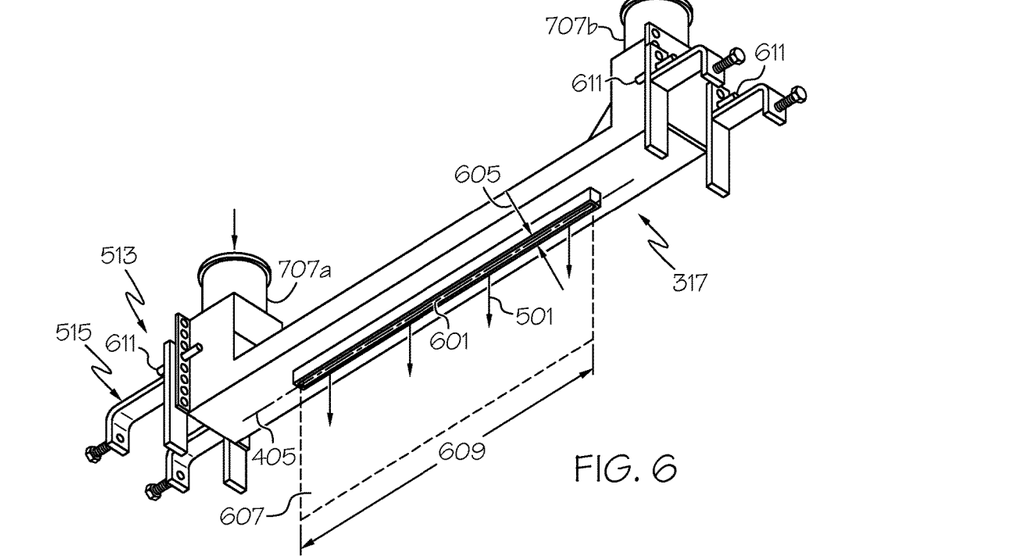
FIG. 6 is a lower perspective view of an example nozzle.
Figures 7, 8:
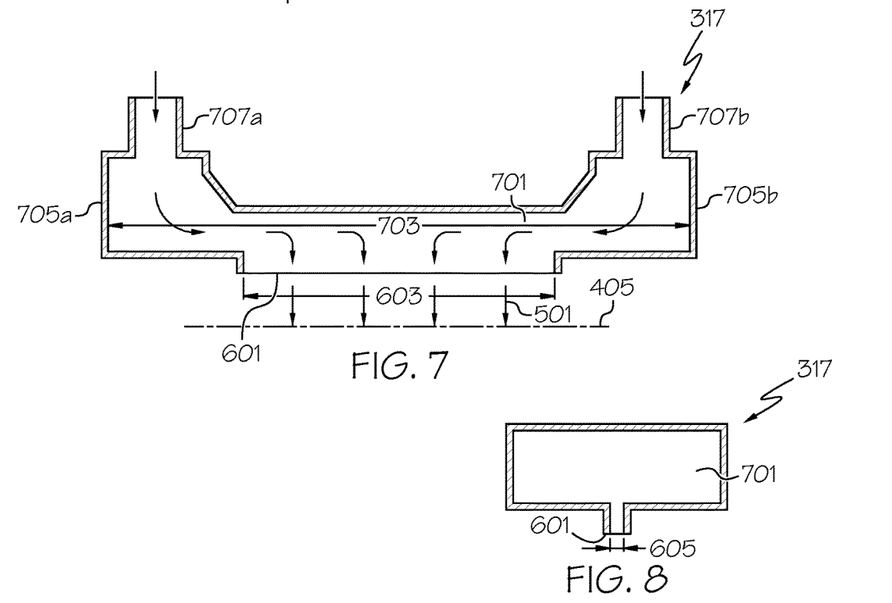
FIG. 7 is a cross-sectional view of the nozzle of FIG. 6 taken along an elongated length of the nozzle.
FIG. 8 is another cross-sectional view of the central portion of the nozzle of FIG. 6 taken transverse to the elongated length of the nozzle.

As shown in FIGS. 6-8, the at least one nozzle comprises at least one elongated port 601 extending transverse to the travel path 301 (schematically shown in FIG. 4) defined by the conduit 137. The at least one elongated port includes an elongated length 603 and a width 605 extending transverse to the elongated length 603. In one example, the width 605 of the elongated port is within a range of from about 0.4 cm to about 2.4 cm, such as from about 0.8 cm to about 2.4 cm, such as from about 1.2 cm to about 2.4 cm, such as from about 1.6 cm to about 2.4 cm, such as from about 2.0 cm to about 2.4 cm, including all ranges and sub-ranges therebetween. In further examples, the width 605 of the elongated port 601 can be less than about 5% of the elongated length of the elongated port, such as less than about 4%, such as less than about 3%, such as less than about 2%, such as less than about 1% of the elongated length of the elongated port, including all ranges and sub-ranges therebetween.

As shown in FIGS. 6 and 7, the at least one elongated port 601 comprises a single elongated port extending along the entire elongated length 603 of the elongated port. Alternatively, although not shown, the at least one elongated port may comprise a plurality of ports arranged along the cooling axis 603. For instance, a plurality of apertures may be spaced apart along the cooling axis 603, a plurality of elongated apertures, or other configurations may be provided that are aligned along the cooling axis 603.

As shown in FIG. 7, the at least one nozzle 317 may include an elongated pressure chamber 701 including an elongated length 703 extending along the elongated length 603 of the at least one elongated port 601. As shown, the elongated pressure chamber 701 is in fluid communication with the elongated port 601 such that pressurized fluid within the chamber 701 may be forced through the elongated port into a stream 501 of cooling fluid. Furthermore, as further shown in FIG. 7, the at least one nozzle 317 includes a first lateral side portion 705a and a second lateral side portion 705b with the elongated length 603 of the at least one pressure port 601 at least partially laterally extending between the first lateral side portion 705a and the second lateral side portion 705b. The nozzle 317 may include one or any plurality of ports configured to feed cooling fluid into the pressure chamber 701. For instance, as shown, the nozzle 317 includes at least two ports including a first inlet port 707a located at the first lateral side portion 705a and a second inlet port 707b located at the second lateral side portion 705b. Providing a plurality of ports can help distribute pressurized cooling fluid within the pressure chamber 701 to provide a consistent stream of cooling fluid exiting the elongated port 601.

Methods of processing molten material will now be discussed. The method can include flowing molten material 121 through an interior of a conduit from a first station to a second station of the glass manufacturing apparatus. The first station can comprise the melting vessel 105, the fining vessel 127, the mixing chamber 131, the delivery vessel 133, or other station of the glass manufacturing apparatus. The second station can comprise the fining vessel 127, the mixing chamber 131, the delivery vessel 133, the forming vessel 143, or other station of the glass manufacturing apparatus. For example, as shown in FIGS. 1, 3 and 4, the first station can comprise the mixing chamber 131 and the second station can comprise the delivery vessel 133 positioned downstream from the mixing chamber 131. Referring to FIG. 3, molten material flows through the interior of the conduit 137 along the travel path 301 from the first station (e.g., the mixing chamber 131) to the second station (e.g., the delivery vessel 133) of the glass manufacturing apparatus 101.

The method may further include cooling the molten material 121 within the interior of the conduit 137, for example, by optionally passing the cooling fluid 303 along the exterior 305 of the conduit 137. As shown in FIG. 3, the cooling fluid may optionally travel in the direction 316 from the second station (e.g., the delivery vessel 133) to the first station (e.g., the mixing chamber 131). As mentioned previously, providing opposite flow directions of the cooling fluid and the molten material may enhance the temperature differential, and consequently the heat transfer rate, at the portion of the conduit adjacent the delivery vessel 133. In some embodiments, the cooling fluid may be substantially free from oxygen. In some embodiments, the cooling fluid may comprise nitrogen although other inert chemical elements may be used that inhibit, such as prevent, oxidation of the conduit 137.

In various embodiments, cooling the molten material 121 within the interior of the conduit 137 can include forcing the stream 501 of cooling fluid against the exterior 503 of the conduit 137 (see FIG. 5) along the cooling axis 405 (see FIG. 4) extending transverse to the travel path 301 defined by the conduit 137 between the first lateral side 401 and a second lateral side 403 of the conduit 137. Forcing cooling fluid along the cooling axis can help enhance convective heat transfer, thereby reducing the temperature of the molten material within the conduit 137. As shown in FIG. 4, in some embodiments, the cooling axis 405 can extend perpendicular to the travel path 301, wherein angle "A" is approximately 90°, although other angles may be provided in further embodiments. Although the illustrated cooling axis 405 comprises a linear cooling axis, different shaped cooling axis may be provided in further embodiments, such as a sinusoidal cooling axis, a C-shaped cooling axis or other curvilinear axis configuration.

Providing the nozzle 317 of the disclosure can be particularly beneficial in applications where the conduit 137 includes a transverse channel 407 (see FIGS. 4 and 5) that extends transverse with respect to the travel path 301, for example, between the first lateral side 401 and the second lateral side 403 of the conduit 137. As shown in FIG. 5, the transverse channel 407 may be formed, for example, by transverse protruding features such as the illustrated support structures 306 that protrude away from the core 307 or a feature overlying the core 307. As such, the channel 407 can be formed from a lower base surface 509 and opposite sides 511a, 511b extending upward away from the core 307. As shown in FIG. 5, a cross-sectional profile of the transverse channel 407 along a vertical plane passing through the travel path 301 defined by the conduit 137 can form a U-shape profile including an upper open end and a lower base surface 509.

As shown in FIG. 4, the cooling axis 405 extends within the transverse channel 407 defined by the conduit 137. As shown in FIG. 5, in operation, the stream of fluid 501 can be forced against the base 509 of the transverse channel 407. The stream of cooling fluid can be dispersed by the base 509 of the transverse channel 407 to travel up opposite sides 511a, 511b of the channel 407.

In some embodiments, the stream of cooling fluid 501 can comprise a sheet 607 of cooling fluid as shown in FIG. 6. The sheet of cooling fluid can more accurately impact the base 509 of the transverse channel 407. In various embodiments, the sheet of cooling fluid (e.g., inert gas such as nitrogen) can impact the base 509 of the transverse channel 407 along substantially the entire width "W" of the conduit 137 although the sheet of cooling fluid may have a length greater than the width "W" or less than the width "W" in further examples.

As shown, the sheet 607 of cooling fluid may be a substantially continuous sheet of fluid along the entire length 609 of the sheet 607 of cooling fluid. Throughout the application, a substantially continuous sheet of fluid includes a sheet of fluid that does not include any velocity fluctuations across the width of the sheet where the cooling fluid is forced against the exterior 503 of the conduit 137 along the cooling axis 405. In alternative embodiments, for instance with a plurality of pressure ports 601, the sheet of cooling fluid may comprise a discontinuous sheet wherein the fluid velocity is not substantially continuous along the length of the sheet. While a discontinuous sheet of cooling fluid may be desired in certain applications, providing the illustrated substantially continuous sheet 607 of cooling fluid can help provide even cooling characteristics across the width "W" of the conduit 137.

FIG. 3 illustrates steps in one particular example method of processing the molten material 121. As discussed previously, the method can include flowing molten material 121 through the interior of the conduit 137 along the travel path 301 defined by the conduit 137 from the first station (e.g., the mixing chamber 131) to the second station (e.g., the delivery vessel 133) of the glass manufacturing apparatus 101. The method can further include cooling the molten material 121 within the interior of the conduit 137 by forcing a stream 501 of cooling fluid against the exterior 305 of the conduit 137 along the cooling axis 405 extending transverse to the travel path 301 defined by the conduit 137 between the first lateral side 401 and the second lateral side 403 of the conduit 137.

In one example, a portion 303a of the cooling fluid 303 can enter an upstream portion 311 of the containment area 309 to be received within a conduit 319 and driven by a fan 321. The cooling fluid is divided by conduit segments 323, 325 to respectively deliver cooled fluid into the first inlet port 707a and the second inlet port 707b of the nozzle 317. Although not shown, additional conduit segments may be divided from the conduit 319 to feed inlet ports of additional nozzles (if provided). The cooling fluid may then be pressurized within the pressure chamber 701 and forced out of the pressure port 601 as a stream 501 of cooling fluid to impact the conduit along the cooling axis 405.

The above-referenced cooling with the nozzles 317 permits targeted cooling along a cooling axis that, in some examples, may be positioned within a center portion of a base of the transverse channel. As such, enhanced convection cooling rates can be realized at the base of the channel. Furthermore, the base can disperse the cooling fluid to travel up the opposite sides of the transverse channel, thereby promoting additional heat transfer from the protrusions (e.g., support structures) extending upward in a direction away from the core of the conduit 137. Heat transfer from the conduit may therefore be maximized by use of one or a plurality of nozzles positioned to provide a cooling axis within one, a plurality, or all of the channels in the conduit. Although not shown, additional nozzles may be positioned to impact the bottom portion 507 of the conduit 137 in embodiments including transverse channels on the bottom portion 507 of the conduit 137.

To adjust the vertical location of the nozzles 137, an adjustable bracket 513 may be provided. The adjustable bracket can include a plurality of vertically aligned apertures wherein pins 611 through the holes at the correct elevation can lock the vertical position of the nozzle 137 that, in some embodiments, can be supported with a clamp 515 on a support rail 517.

In addition to cooling with the at least one nozzle 317, further cooling can be provided by a second portion 303*b*, 303*c* of the cooling fluid 303 entering through the upstream portion 311 of the containment area 309. Indeed the second portion 303*b*, 303*c* may travel around the delivery vessel 133 and along the first lateral side 401 and/or the second lateral side 403. Consequently the cooling rate of the conduit can be enhanced by cooling the top portion 505 (and optionally the bottom portion 507) with the nozzles. The nozzles maximize cooling within the transverse channels and prevent stagnated pockets of fluid that would inhibit efficient heat transfer. In addition, the cooling rate of the conduit can be further enhanced by cooling the first lateral side 401 and the second lateral side 403 of the conduit 137 with cooling fluid traveling in direction 316 along the transverse sides of the conduit.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of processing molten glass-forming material comprising:
   flowing the molten glass-forming material through an interior of a conduit along a travel path defined by the conduit from a first station to a second station of a glass manufacturing apparatus;
   feeding a coding fluid through at least two inlet ports into a pressure chamber extending along a cooling axis extending transverse to the travel path between a first lateral side and a second lateral side of the conduit;
   forcing the cooling fluid from the pressure chamber through a port as a sheet of cooling fluid formed at the port, wherein the port is elongated along the cooling axis; and
   cooling the molten glass-forming material within the interior of the conduit by forcing the sheet of coding fluid from the elongated port against an exterior of the conduit.

2. The method of claim 1, wherein the cooling axis extends perpendicular to the travel path.

3. The method of claim 1, wherein the cooling axis comprises a linear cooling axis.

4. The method of claim 1, wherein the cooling the molten glass-forming material comprises forcing the sheet of cooling fluid from the elongated port against the exterior of the conduit within a channel that extends transverse relative to the travel path.

5. The method of claim 4, wherein the exterior of the conduit comprises a base of the channel.

6. The method of claim 5, wherein the sheet of cooling fluid is dispersed by the base of the channel to travel up opposite sides of the channel.

7. The method of claim 5, wherein the sheet of cooling fluid comprises a substantially continuous sheet of cooling fluid forced against the base of the channel.

8. The method of claim 1, wherein the sheet of cooling fluid comprises a substantially continuous sheet of cooling fluid.

9. The method of claim 1, wherein the cooling fluid is substantially free of oxygen.

10. The method of claim 9, wherein the cooling fluid comprises nitrogen.

11. The method of claim 1, further comprising mixing the molten glass-forming material to provide a homogenous molten glass-forming material in the first station of the glass manufacturing apparatus.

12. The method of claim 11, further comprising delivering the molten glass-forming material from the second station to an inlet of a forming vessel of the glass manufacturing apparatus.

13. The method of claim 1, further comprising delivering the molten glass-forming material from the second station to an inlet of a forming vessel of the glass manufacturing apparatus.

\* \* \* \* \*

UNITED STATES PATENT AND TRADEMARK OFFICE
CERTIFICATE OF CORRECTION

PATENT NO. : 10,501,358 B2
APPLICATION NO. : 15/570917
DATED : December 10, 2019
INVENTOR(S) : Jin-soo Kim et al.

Page 1 of 1

It is certified that error appears in the above-identified patent and that said Letters Patent is hereby corrected as shown below:

In the Claims

In Column 11, Line 41 (approx.), Claim 1, delete "coding" and insert -- cooling --, therefor.

In Column 12, Line 6, Claim 1, delete "coding" and insert -- cooling --, therefor.

Signed and Sealed this
Eighteenth Day of February, 2020

Andrei Iancu
*Director of the United States Patent and Trademark Office*